(12) United States Patent
Lee et al.

(10) Patent No.: US 12,438,211 B2
(45) Date of Patent: Oct. 7, 2025

(54) ELECTROLYTE EXTRACTION SYSTEM AND METHOD

(71) Applicant: LG ENERGY SOLUTION, LTD., Seoul (KR)

(72) Inventors: Daeki Lee, Daejeon (KR); Rin Jang, Daejeon (KR); Yeu Young Youn, Daejeon (KR)

(73) Assignee: LG ENERGY SOLUTIONS LTD., Seoul (KR)

( * ) Notice: Subject to any disclaimer, the term of this patent is extended or adjusted under 35 U.S.C. 154(b) by 80 days.

(21) Appl. No.: 18/282,981

(22) PCT Filed: Jul. 26, 2022

(86) PCT No.: PCT/KR2022/010952
§ 371 (c)(1),
(2) Date: Sep. 19, 2023

(87) PCT Pub. No.: WO2023/008873
PCT Pub. Date: Feb. 2, 2023

(65) Prior Publication Data
US 2024/0170750 A1    May 23, 2024

(30) Foreign Application Priority Data
Jul. 30, 2021   (KR) .................. 10-2021-0100283

(51) Int. Cl.
*H01M 10/54* (2006.01)
*B01D 11/02* (2006.01)
*B65G 15/30* (2006.01)

(52) U.S. Cl.
CPC ......... *H01M 10/54* (2013.01); *B01D 11/0288* (2013.01); *B65G 15/30* (2013.01)

(58) Field of Classification Search
CPC . Y10T 83/051; Y10T 83/202; Y10T 83/2092; Y10T 83/2187; Y10T 83/2192;
(Continued)

(56) References Cited

U.S. PATENT DOCUMENTS 3,680,420 A * 8/1972 Blum .................. G01N 1/06
83/167
5,491,037 A    2/1996 Kawakami
(Continued)

FOREIGN PATENT DOCUMENTS

JP    6-251805 A    9/1994
JP    9-211090 A    8/1997
(Continued)

*Primary Examiner* — Phong H Nguyen
(74) *Attorney, Agent, or Firm* — Bryan Cave Leighton Paisner LLP

(57) ABSTRACT

An electrolyte extraction system and a method for extracting electrolyte from a battery using the same are provided. The electrolyte extraction system comprises a first transfer unit transferring a lower jig having an upper surface on which a battery is mounted; a loading unit accommodating the lower jig together with the battery in a freezing tank filled with liquid nitrogen; a cutting unit cutting the battery inside the freezing tank; an unloading unit taking out the lower jig together with the battery from the freezing tank and accommodating the same in an electrolyte extraction tank; and a second transfer unit transferring the electrolyte extraction tank in which the battery is accommodated.

10 Claims, 2 Drawing Sheets

(58) Field of Classification Search
CPC ... Y10T 83/222; Y10T 83/242; Y10T 83/444; Y10T 83/445; Y10T 83/485; Y10T 83/5669; Y10T 83/619; Y10T 83/748; Y10T 83/7487; Y10T 83/75; Y10T 83/8821; Y10T 83/9416; Y10T 83/9423; Y10T 83/9425; Y10T 83/9428; Y10T 83/9437; Y10T 83/9444; Y10T 83/9447; H01M 10/54; B01D 11/0288; B65G 15/30

See application file for complete search history.

(56) References Cited

U.S. PATENT DOCUMENTS 6,030,421 A * 2/2000 Gauthier ........... H01M 10/0436
29/623.3

2014/0298962 A1 * 10/2014 Morris ............... B26F 1/14
83/13

2021/0078012 A1  3/2021  Kochhar et al.

FOREIGN PATENT DOCUMENTS

| | | |
|---|---|---|
| JP | 10-241748 A | 9/1998 |
| JP | 11-260426 A | 9/1999 |
| JP | 2005-055175 A | 3/2005 |
| JP | 2012-110850 A | 6/2012 |
| JP | 2015-002107 A | 1/2015 |
| KR | 10-1999-0086604 A | 12/1999 |
| KR | 10-2000-0019850 A | 4/2000 |
| KR | 10-1372010 B1 | 3/2014 |
| KR | 10-2015-0053341 A | 5/2015 |
| KR | 10-2019-0078653 A | 7/2019 |
| KR | 10-2019-0097651 A | 8/2019 |
| KR | 10-2020-0024967 A | 3/2020 |

* cited by examiner

ELECTROLYTE EXTRACTION SYSTEM AND METHOD

CROSS-REFERENCE TO RELATED APPLICATION

This application is a National Stage Application of International Application No. PCT/KR2022/010952 filed on Jul. 26, 2022, which claims the benefit of priority based on Korean Patent Application No. 10-2021-0100283 filed on Jul. 30, 2021, the entire disclosures of which are incorporated herein by reference.

The present disclosure relates to an electrolyte extraction system and method, and more particularly, to an electrolyte extraction system and method for stably extracting electrolyte from a battery by disassembling the battery.

BACKGROUND

In battery development, there is a continuous need to understand the relationship between the degree of depletion of electrolyte according to the driving of the battery and the mechanism of battery degradation.

For example, by analyzing the absolute content of the electrolyte remaining in the battery, it is necessary to understand the absolute amount of the electrolyte before and after driving the battery and the tendency of electrolyte depletion due to the driving.

To this end, after a battery which is a finished product is driven under specific conditions, the electrolyte inside the battery must be extracted, and for this purpose, the process of disassembling the battery to extract the electrolyte inside the battery case is performed.

In performing the above process, as an automated method and system, there is a need for a method and system capable of preventing an accident due to an impact applied to the battery and stably extracting the electrolyte inside the battery without loss.

SUMMARY

Technical Goals

The present disclosure relates to an electrolyte extraction system and method, and more particularly, an object of the present disclosure is to provide an electrolyte extraction system and method for stably extracting an electrolyte from a battery without loss by disassembling the battery.

Technical objects achieved by the present disclosure are not limited to the technical objects mentioned above, and other technical objects not mentioned will be clearly understood by one of ordinary skill in the art to which the present disclosure belongs from the following description.

Technical Solutions

An electrolyte extraction system of the present disclosure may include:
- a first transfer unit transferring a lower jig having an upper surface on which a battery is mounted;
- a loading unit accommodating the lower jig together with the battery in a freezing tank filled with liquid nitrogen;
- a cutting unit cutting the battery inside the freezing tank;
- an unloading unit taking out the lower jig together with the battery from the freezing tank and accommodating the same in an electrolyte extraction tank; and
- a second transfer unit transferring the electrolyte extraction tank in which the battery is accommodated.

Advantageous Effects

The electrolyte extraction system of the present disclosure is an automated system, and may be capable of rapid electrolyte extraction for a plurality of batteries.

The electrolyte extraction system and method of the present disclosure may prevent accidents due to an impact applied to the battery and stably extract the electrolyte inside the battery without loss.

DETAILED DESCRIPTION

Figure 1:
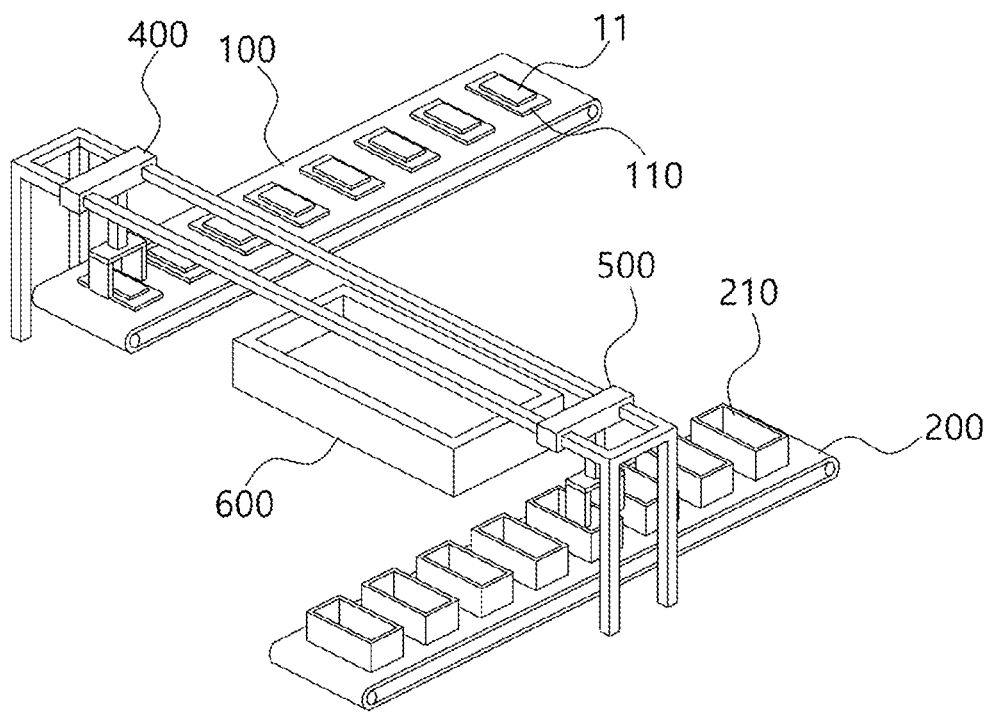
FIG. 1 is a schematic diagram illustrating an electrolyte extraction system of the present disclosure.

An electrolyte extraction system of the present disclosure may include:
- a first transfer unit transferring a lower jig having an upper surface on which a battery is mounted;
- a loading unit accommodating the lower jig together with the battery in a freezing tank filled with liquid nitrogen;
- a cutting unit cutting the battery inside the freezing tank;
- an unloading unit taking out the lower jig together with the battery from the freezing tank and accommodating the same in an electrolyte extraction tank; and
- a second transfer unit transferring the electrolyte extraction tank in which the battery is accommodated.

In the electrolyte extraction system of the present disclosure, the first transfer unit and the second transfer unit may be conveyor belts.

In the electrolyte extraction system of the present disclosure, a plurality of the lower jigs and a plurality of the electrolyte extraction tanks may be provided, the plurality of the lower jigs may be arranged along a longitudinal direction of the first transfer unit, and the plurality of the electrolyte extraction tanks may be arranged along a longitudinal direction of the second transfer unit.

In the electrolyte extraction system of the present disclosure, the cutting unit may include an upper jig pressing an upper surface of the battery, a blade unit penetrating the upper jig in a vertical direction, and a driving unit driving the upper jig and the blade unit in the vertical direction.

In the electrolyte extraction system of the present disclosure, a lower surface of the upper jig and the upper surface of the lower jig may face each other with the battery interposed therebetween, the upper jig may comprise a blade penetration hole, through which the blade unit passes, formed therein, and the lower jig may comprise a blade protection groove formed at a position facing the blade penetration hole.

In the electrolyte extraction system of the present disclosure, the blade unit may include a first blade extending in a first direction perpendicular to the vertical direction, and a second blade extending in a second direction perpendicular to the vertical direction and the first direction.

In the electrolyte extraction system of the present disclosure, the electrolyte extraction tank may be filled with an electrolyte extraction solvent, and the electrolyte extraction solvent may be an organic solvent.

An electrolyte extraction method of the present disclosure may include a loading step of mounting a pouch-type battery on an upper surface of a lower jig;

a freezing step of immersing the lower jig on which the battery is mounted in liquid nitrogen filled in a freezing tank;

a fixing step of fixing the battery by pressing an upper surface of the battery with an upper jig;

a cutting step of cutting the battery by passing a blade through a blade penetration hole formed in the upper jig;

an unloading step of separating the upper jig from the battery and taking the battery and the lower jig out of the freezing tank; and an electrolyte extracting step of immersing the battery and the lower jig in an electrolyte extraction solvent filled in an electrolyte extraction tank.

In the loading step of the electrolyte extraction method of the present disclosure, a plurality of the batteries and a plurality of the lower jigs may be provided, each of the plurality of the batteries may be mounted on each of the plurality of the lower jigs, and the freezing step, the fixing step, the cutting step, and the unloading step may be sequentially performed for each of the plurality of the batteries.

In the extracting step of the electrolyte extraction method of the present disclosure, a plurality of the electrolyte extraction tanks may be provided, and each of the plurality of the batteries may be accommodated in a different electrolyte extraction tank from each other.

Hereinafter, embodiments according to the present disclosure will be described in detail with reference to the accompanying drawings. In this process, the size or shape of the components shown in the drawings may be exaggerated for clarity and convenience of explanation. In addition, terms specifically defined in consideration of the configuration and operation of the present disclosure may vary depending on the intention or custom of the user or operator. Definitions of these terms should be made based on the content throughout this specification.

In the description of the present invention, it should be noted that the orientation or positional relationship indicated by the terms "center", "top", "bottom" "left", "right", "vertical", "horizontal", "inside", "outside", "one side", "other side", etc., are based on the orientation or positional relationship shown in the drawings, or the orientation or positional relationship usually placed when using the product of the present disclosure, and it is not to be construed as limiting the present disclosure as it is only for the purpose of description and brief description of the present description and does not suggest or imply that the indicated device or element must have the specified orientation and be configured or operated in the specified orientation.

Figure 2A:
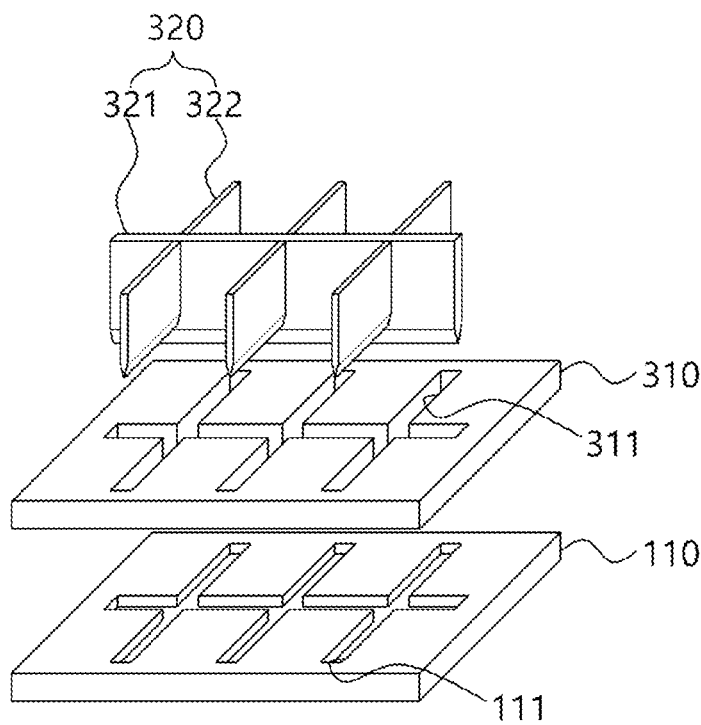
FIGS. 2A and 2B are schematic diagrams of a blade unit and an upper jig.
Figure 2B:
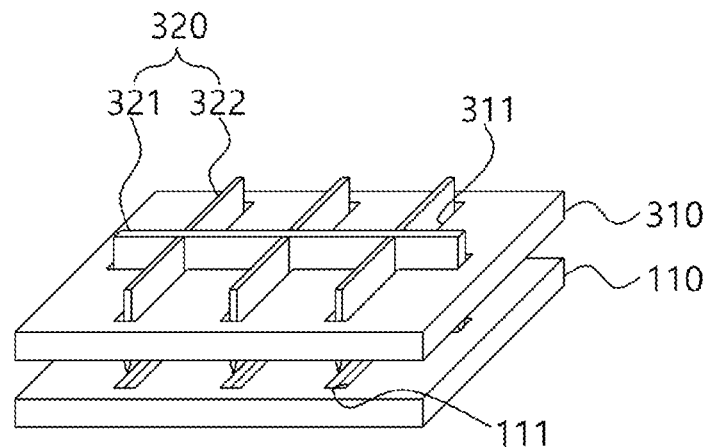
Figure 3:
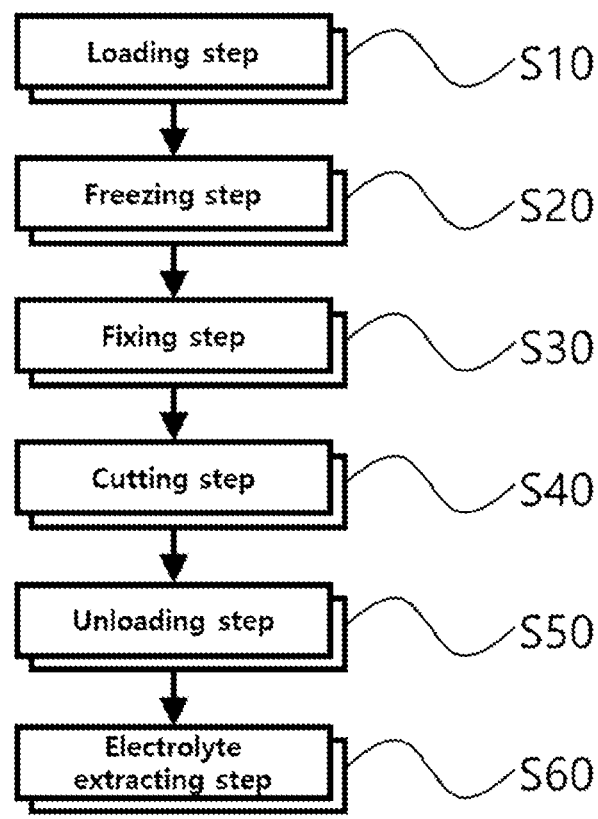
FIG. 3 is a block diagram illustrating an electrolyte extraction method of the present disclosure.

FIG. 1 is a schematic diagram illustrating an electrolyte extraction system of the present disclosure. FIGS. 2A and 2B are schematic diagrams of a blade unit 320 and an upper jig 310. FIG. 3 is a block diagram illustrating an electrolyte extraction method of the present disclosure.

Hereinafter, with reference to FIGS. 1 to 3, the electrolyte extraction system and method of the present disclosure will be described in detail.

The electrolyte extraction system and method of the present disclosure is for extracting electrolyte from a secondary battery 11 which is a finished product, and after destroying the battery case, the electrolyte may be extracted. More specifically, it may extract the electrolyte by immersing the pieces of the battery 11 in an electrolyte extraction solvent, by cutting together an electrode assembly formed by stacking a positive electrode current collector, a negative electrode current collector and a separator, and a battery case accommodating the electrode assembly into a plurality of pieces. In other words, the electrolyte extraction system and method of the present disclosure may be to extract the electrolyte by cutting the used or unused finished battery 11 into a plurality of pieces.

The electrolyte extraction system and method of the present disclosure may be used for pretreatment of the battery 11 for an experiment analyzing the absolute amount of the electrolyte remaining before and after the operation of the battery 11 and the depletion tendency according to the operation, through the analysis of the absolute content of the electrolyte remaining in the battery 11.

The battery 11 to which the electrolyte extraction system and method of the present disclosure is applied is a secondary battery, and may be a pouch-type battery, a prismatic battery, a cylindrical battery, a coin-type battery, and the like, and may be more specialized for a pouch-type battery.

As illustrated in FIG. 1, an electrolyte extraction system of the present disclosure may include:

a first transfer unit 100 transferring a lower jig 110 having an upper surface on which a battery 11 is mounted;

a loading unit 400 accommodating the lower jig 110 together with the battery 11 in a freezing tank 600 filled with liquid nitrogen;

a cutting unit (not shown) cutting the battery 11 inside the freezing tank 600;

an unloading unit 500 taking out the lower jig 110 together with the battery 11 from the freezing tank 600 and accommodating the same in an electrolyte extraction tank 210;

and a second transfer unit 200 transferring the electrolyte extraction tank 210 in which the battery 11 is accommodated.

The electrolyte extraction system of the present disclosure may be performed for a plurality of the batteries 11. Therefore, in order to sequentially input or discharge the plurality of batteries 11 to the process of the system, it may be preferable that the first transfer unit 100 and the second transfer unit 200 be provided to be capable of linearly moving the lower jig 110 and the electrolyte extraction tank 210. For example, the first transfer unit 100 and the second transfer unit 200 may be conveyor belts.

A plurality of the lower jigs 110 and a plurality of the electrolyte extraction tanks 210 may be provided, the plurality of the lower jigs 110 may be arranged along the longitudinal direction of the first transfer unit 100, and the plurality of the electrolyte extraction tanks 210 may be arranged along the longitudinal direction of the second transfer unit 200.

The lower jig 110 is made of a material that does not deform or break at a temperature of minus 190° C. or less, and for example, the material of the lower jig 110 is SUS, aluminum or other alloys (iron alloy, nickel alloy, etc.), etc., which may maintain durability in a situation of rapid temperature change due to repeated contact with liquid nitrogen, and a material having cold resistance in an ultra-low temperature environment may be used without limitation. The lower jig 110 may be provided in the shape of a plate having a surface perpendicular to the vertical direction. The battery 11 is mounted on the upper surface of the lower jig 110, and the adhesive is applied between the lower surface of the battery 11 and the upper surface of the lower jig 110, so that the battery 11 may be fixed on the upper surface of the lower jig 110. By fixing the battery 11 to the right position on the lower jig 110 with an adhesive, it may prevent the battery 11 from escaping from the right position until the battery 11 is pressed with an upper jig 310 to be described later in the freezing water tank 600. The battery 11 may be fixed to the right position on the lower jig 110 by providing a separate jig in the lower jig 110 in addition to the adhesive.

When the battery 11 is fixed to the lower jig 110, the lower jig 110 is put into the first transfer unit 100, and after moving to the loading unit 400 through the first transfer unit 100, it may be put into the freezing tank 600 through the loading unit 400.

The loading unit 400 may be a gantry robot or multi-axis robot equipped with an end effector capable of holding the lower jig 110 such as a gripper, or an actuator capable of pushing or pulling the lower jig 110.

The freezing tank 600 may be filled with a cooling medium capable of cooling the battery 11 such as liquid nitrogen therein. The cooling medium may directly contact the battery 11 to cool the battery 11. It is preferable that the cooling medium filled in the freezing tank 600 does not affect the analysis of the electrolyte, and therefore liquid nitrogen may be the most preferable cooling medium.

The freezing tank 600 may be a water tank having an open upper side. The battery 11 may be accommodated in the freezing tank 600 through the upper part of the freezing tank 600. The lower jig 110 and the battery 11 accommodated in the freezing tank 600 may be completely immersed in liquid nitrogen.

Since the electrolyte extraction system of the present disclosure cuts the battery 11 in an ultra-low temperature environment, it may prevent accidents such as explosion due to an impact applied to the battery 11, and easily cut the battery 11 into multiple pieces.

As illustrated in FIGS. 2A and 2B, the cutting unit may include an upper jig 310 pressing an upper surface of the battery 11, a blade unit 320 penetrating the upper jig 310 in a vertical direction, and a driving unit (not shown) driving the upper jig 310 and the blade unit 320 in the vertical direction.

A lower surface of the upper jig 310 and the upper surface of the lower jig 110 may face each other with the battery 11 interposed therebetween, a blade penetration hole 311 through which the blade unit 320 passes may be formed in the upper jig 310, and a blade protection groove 111 may be formed in the lower jig 110 at a position facing the blade penetration hole 311. Since the electrolyte extraction system of the present disclosure cuts the battery 11 at a very low temperature, the adhesive force between the battery 11 and the lower jig 110 may be weakened. Therefore, it is necessary to fix the battery 11 more completely, and the battery 11 may be completely fixed by pressing the upper surface of the battery 11 with the upper jig 310.

In the electrolyte extraction system of the present disclosure, the battery 11 may be cut by using an imaginary straight line perpendicular to the vertical direction as a cutting line. In other words, the blade unit 320 cuts the battery 11 while moving in the downward direction, and the battery 11 may be separated into a plurality of pieces in a horizontal direction.

Therefore, as illustrated in FIG. 2B, in the state where the battery 11 is sandwiched between the upper jig 310 and the lower jig 110, the blade unit 320 needs to pass through the upper jig 310 in order to access the battery 11. In other words, the lower surface of the upper jig 310 and the upper surface of the lower jig 110 face each other with the battery 11 interposed therebetween, and the upper jig 310 may comprise a blade penetration hole 311 through which the blade unit 320 passes formed therein. As illustrated in FIG. 2A, in order for the blade of the blade unit 320 to completely pass through the battery 11, a blade protection groove 111 may be formed at a position facing the blade penetration hole 311 in the lower jig 110.

The blade unit 320 may include a first blade 321 extending in a first direction perpendicular to the vertical direction, and a second blade 322 extending in a second direction perpendicular to the vertical direction and the first direction. In other words, the blade unit 320 may be formed in a cross shape in which the first blade 321 and the second blade 322 intersect. The length in the first direction of the first blade 321 is formed longer than the length in the second direction of the second blade 322, and a plurality of second blades 322 may be coupled to one first blade 321.

The length in the first direction of the first blade 321 may be formed longer than the length in the first direction of the battery 11, and the length of the second blade 322 in the second direction may be longer than the length of the battery 11 in the second direction.

The blades of the first blade 321 and the second blade 322 may be formed at the lower end, and the driving unit may be connected to the upper end.

The blade penetration hole 311 formed in the upper jig 310 may be formed to correspond thereto in consideration of the standard, shape and arrangement of the first blade 321 and the second blade 322. For example, when the first blade 321 and the second blade 322 are formed in a cross shape, the blade penetration hole 311 may also be formed in a cross shape.

When cutting the battery 11, after pressing the upper surface of the battery 11 with the upper jig 310, the battery 11 may be cut through the blade unit 320. In other words, the driving unit may bring the upper jig 310 closer to the battery 11, and then bring the blade unit 320 closer to the battery 11. The driving unit may be provided as two independent power sources, respectively, provided in the upper jig 310 and the blade unit 320, provided in one power source blade unit 320, and the upper jig 310 and the blade unit 320 may be coupled to each other in a material or structure capable of relative length deformation in the vertical direction. For example, the upper jig 310 and the blade unit 320 may be coupled to each other with a guide bar or an elastic material therebetween.

The power source of the driving unit may be, for example, a pneumatic actuator, an electric linear motor, or the like.

When the battery 11 is cut, the upper jig 310 is removed from the upper surface of the battery 11, and the lower jig 110 and the battery 11 may be moved to the electrolyte extraction tank 210 through the unloading unit 500.

The unloading unit 500 may be a gantry robot or multi-axis robot equipped with an end effector capable of gripping the lower jig 110 such as a gripper, or an actuator capable of pushing or pulling the lower jig 110.

The electrolyte extraction tank 210 is filled with an electrolyte extraction solvent, and the electrolyte extraction solvent may be an organic solvent such as alcohols, ketones, carbonates, and propionates.

The electrolyte extraction tank 210 is provided with an open top, and the unloading unit 500 may load the battery 11 and the lower jig 110 through the top of the electrolyte extraction tank into the electrolyte extraction tank 210.

The plurality of electrolyte extraction tanks 210 are provided and prepared in a state in which they are arranged along the longitudinal direction of the second transfer unit 200, and when the battery 11 is loaded in the empty electrolyte extraction tank 210, the plurality of electrolyte extraction tanks 210 may be moved through the second transfer unit 200, and the empty electrolyte extraction tank 210 may be on standby in front of the unloading unit 500 again.

As illustrated in FIG. 3, the electrolyte extraction method of the present disclosure may include:

- a loading step S10 of mounting the pouch-type battery 11 on an upper surface of the lower jig 110;
- a freezing step S20 of immersing the lower jig 110 on which the battery 11 is mounted in liquid nitrogen filled in the freezing tank 600;
- a fixing step S30 of fixing the battery 11 by pressing an upper surface of the battery 11 with the upper jig 310;
- a cutting step S40 of cutting the battery 11 by passing a blade through the blade penetration hole 311 formed in the upper jig 310;
- an unloading step S50 of separating the upper jig 310 from the battery 11 and taking the battery 11 and the lower jig 110 out of the freezing tank 600; and
- an electrolyte extracting step S60 of immersing the battery 11 and the lower jig 110 in an electrolyte extraction solvent filled in the electrolyte extraction tank 210.

In the loading step S10, the battery 11 may be adhered to the lower jig 110 with an adhesive.

In the loading step S10, a plurality of the batteries 11 and a plurality of the lower jigs 110 are provided, and each of the plurality of the batteries 11 is mounted on each of the plurality of the lower jigs 110, and the freezing step, the fixing step, the cutting step, and the unloading step may be sequentially performed for each of the plurality of the batteries 11.

The loading step S10 and the freezing step S20 may be performed through the loading unit 400 and the first transfer unit 100.

The fixing step S30 and the cutting step S40 may be performed through a cutting unit.

The unloading step S50 may be performed through the unloading unit 500.

In the extracting step S60, a plurality of the electrolyte extraction tank 210 may be provided, and each of the plurality of the batteries 11 may be accommodated in the different electrolyte extraction tank 210 from each other.

Although the embodiments according to the present disclosure have been described above, these are merely exemplary, and one of ordinary skill in the art will understand that various modifications and equivalent ranges of embodiments are possible therefrom. Accordingly, the true technical protection scope of the present disclosure should be defined by the following claims.

The electrolyte extraction system of the present disclosure is an automated system, and may be capable of rapid electrolyte extraction for a plurality of batteries.

The electrolyte extraction system and method of the present disclosure may prevent accidents due to an impact applied to the battery and stably extract the electrolyte inside the battery without loss.

DESCRIPTION OF REFERENCE NUMERALS

11: Battery
100: First transfer unit
110: Lower jig
111: Blade protection groove
200: Second transfer unit
210: Electrolyte extraction tank
310: Upper jig
311: Blade penetration hole
320: Blade unit
321: First blade
322: Second blade
400: Loading unit
500: Unloading unit
600: Freezing tank

The invention claimed is:

1. An electrolyte extraction system comprising:
   a first transfer unit transferring a lower jig having an upper surface on which a battery is mounted;
   a loading unit accommodating the lower jig together with the battery in a freezing tank filled with liquid nitrogen;
   a cutting unit cutting the battery inside the freezing tank;
   an unloading unit taking out the lower jig together with the battery from the freezing tank and accommodating the same in an electrolyte extraction tank; and
   a second transfer unit transferring the electrolyte extraction tank in which the battery is accommodated.

2. The electrolyte extraction system according to claim 1, wherein the first transfer unit and the second transfer unit are conveyor belts.

3. The electrolyte extraction system according to claim 2, wherein a plurality of the lower jigs and a plurality of the electrolyte extraction tanks are provided,
   wherein the plurality of the lower jigs are arranged along a longitudinal direction of the first transfer unit, and
   wherein the plurality of the electrolyte extraction tanks are arranged along a longitudinal direction of the second transfer unit.

4. The electrolyte extraction system according to claim 1, wherein the cutting unit comprises:
   an upper jig pressing an upper surface of the battery;
   a blade unit penetrating the upper jig in a vertical direction; and
   a driving unit driving the upper jig and the blade unit in the vertical direction.

5. The electrolyte extraction system according to claim 4, wherein a lower surface of the upper jig and the upper surface of the lower jig face each other with the battery interposed therebetween,
   wherein the upper jig comprises a blade penetration hole, through which the blade unit passes, formed therein, and
   wherein the lower jig comprises a blade protection groove formed at a position facing the blade penetration hole.

6. The electrolyte extraction system according to claim 4, wherein the blade unit comprises:
   a first blade extending in a first direction perpendicular to the vertical direction; and
   a second blade extending in a second direction perpendicular to the vertical direction and the first direction.

7. The electrolyte extraction system according to claim 1, wherein the electrolyte extraction tank is filled with an electrolyte extraction solvent, and
   wherein the electrolyte extraction solvent is an organic solvent.

8. An electrolyte extraction method comprising:
   a loading step of mounting a pouch-type battery on an upper surface of a lower jig;
   a freezing step of immersing the lower jig on which the battery is mounted in liquid nitrogen filled in a freezing tank;
   a fixing step of fixing the battery by pressing an upper surface of the battery with an upper jig;

a cutting step of cutting the battery by passing a blade through a blade penetration hole formed in the upper jig;

an unloading step of separating the upper jig from the battery and taking the battery and the lower jig out of the freezing tank; and an electrolyte extracting step of immersing the battery and the lower jig in an electrolyte extraction solvent filled in an electrolyte extraction tank.

9. The electrolyte extraction method according to claim 8, wherein a plurality of the batteries and a plurality of the lower jigs are provided in the loading step, wherein each of the plurality of the batteries is mounted on each of the plurality of the lower jigs, and wherein the freezing step, the fixing step, the cutting step, and the unloading step are sequentially performed for each of the plurality of the batteries.

10. The electrolyte extraction method according to claim 8, wherein a plurality of the batteries are provided in the loading step, wherein a plurality of the electrolyte extraction tanks are provided in the extracting step, wherein each of the plurality of the batteries is accommodated in a different electrolyte extraction tank from each other.

* * * * *